(12) United States Patent
Pedersen

(10) Patent No.: US 7,797,245 B2
(45) Date of Patent: Sep. 14, 2010

(54) METHODS AND SYSTEMS FOR IDENTIFYING AN AREA OF INTEREST IN PROTECTABLE CONTENT

(75) Inventor: Palle Martin Pedersen, Brookline, MA (US)

(73) Assignee: Black Duck Software, Inc., Waltham, MA (US)

( * ) Notice: Subject to any disclaimer, the term of this patent is extended or adjusted under 35 U.S.C. 154(b) by 580 days.

(21) Appl. No.: 11/084,063

(22) Filed: Mar. 18, 2005

(65) Prior Publication Data

US 2006/0212464 A1 Sep. 21, 2006

(51) Int. Cl.
*G06F 7/00* (2006.01)
*G06F 17/30* (2006.01)

(52) U.S. Cl. ................ 705/59; 717/131; 726/32
(58) Field of Classification Search .......... 705/50–79
See application file for complete search history.

(56) References Cited

U.S. PATENT DOCUMENTS

| | | | |
|---|---|---|---|
| 5,313,616 A | 5/1994 | Cline et al. | |
| 5,343,527 A | 8/1994 | Moore | |
| 5,469,354 A | 11/1995 | Hatakeyama et al. | |
| 5,577,249 A | 11/1996 | Califano | |
| 5,765,152 A | 6/1998 | Erickson | |
| 5,774,883 A | 6/1998 | Andersen et al. | |
| 5,796,830 A | 8/1998 | Johnson et al. | |
| 5,892,900 A | 4/1999 | Ginter et al. | |
| 5,893,095 A | 4/1999 | Jain et al. | |
| 5,917,912 A | 6/1999 | Ginter et al. | |
| 5,958,051 A | 9/1999 | Renaud et al. | |
| 6,029,002 A * | 2/2000 | Afifi et al. ................ 717/131 | |
| 6,035,402 A | 3/2000 | Vaeth et al. | |
| 6,072,493 A | 6/2000 | Driskell et al. | |
| 6,148,401 A | 11/2000 | Devanbu et al. | |
| 6,188,995 B1 | 2/2001 | Garst et al. | |
| 6,189,146 B1 | 2/2001 | Misra et al. | |
| 6,226,618 B1 * | 5/2001 | Downs et al. ............... 705/1 | |
| 6,240,409 B1 | 5/2001 | Aiken | |
| 6,249,769 B1 | 6/2001 | Ruffin et al. | |
| 6,260,141 B1 | 7/2001 | Park | |
| 6,263,348 B1 | 7/2001 | Kathrow et al. | |
| 6,275,223 B1 | 8/2001 | Hughes et al. | |
| 6,282,698 B1 | 8/2001 | Baker et al. | |
| 6,330,670 B1 | 12/2001 | England et al. | |
| 6,381,698 B1 | 4/2002 | Devanbu et al. | |
| 6,393,438 B1 | 5/2002 | Kathrow et al. | |
| 6,397,205 B1 | 5/2002 | Juola | |

(Continued)

FOREIGN PATENT DOCUMENTS

WO WO-/02/27486 4/2002

OTHER PUBLICATIONS

Examination Report for related European Application No. 06737533.7, mailed Jan. 15, 2008, 2 pages.

(Continued)

*Primary Examiner*—Andrew J. Fischer
*Assistant Examiner*—Thomas West
(74) *Attorney, Agent, or Firm*—Goodwin Procter LLP

(57) ABSTRACT

A protectable content is inspected using both a first technique and a second technique that is different from the first technique. An area of interest in the protectable content is then identified based on the inspections.

31 Claims, 2 Drawing Sheets

U.S. PATENT DOCUMENTS

| | | | |
|---|---|---|---|
| 6,480,834 | B1 | 11/2002 | Engle et al. |
| 6,480,959 | B1 | 11/2002 | Granger et al. |
| 6,493,709 | B1 | 12/2002 | Aiken |
| 6,499,035 | B1 | 12/2002 | Sobeski |
| 6,546,114 | B1 | 4/2003 | Venkatesan et al. |
| 6,557,105 | B1 | 4/2003 | Tardo et al. |
| 6,574,348 | B1 | 6/2003 | Venkatesan et al. |
| 6,658,626 | B1 | 12/2003 | Aiken |
| 6,862,696 | B1 | 3/2005 | Voas et al. |
| 6,931,532 | B1 | 8/2005 | Davis et al. |
| 6,941,459 | B1 | 9/2005 | Hind et al. |
| 6,954,747 | B1 | 10/2005 | Wang et al. |
| 6,961,849 | B1 | 11/2005 | Davis et al. |
| 6,976,170 | B1 | 12/2005 | Kelly |
| 6,978,367 | B1 | 12/2005 | Hind et al. |
| 6,981,023 | B1 | 12/2005 | Hamilton et al. |
| 6,983,371 | B1 | 1/2006 | Hurtado et al. |
| 7,197,156 | B1 | 3/2007 | Levy |
| 7,254,587 | B2 | 8/2007 | Lee et al. |
| 7,305,701 | B2 | 12/2007 | Brezak et al. |
| 2002/0065781 | A1 | 5/2002 | Hillegass et al. |
| 2002/0138441 | A1 | 9/2002 | Lopatic |
| 2002/0138477 | A1 | 9/2002 | Keiser |
| 2002/0138764 | A1 | 9/2002 | Jacobs et al. |
| 2002/0162030 | A1 | 10/2002 | Brezak et al. |
| 2002/0188608 | A1 | 12/2002 | Nelson et al. |
| 2002/0194010 | A1 | 12/2002 | Bergler et al. |
| 2003/0018891 | A1 | 1/2003 | Hall et al. |
| 2003/0074163 | A1 | 4/2003 | Anand et al. |
| 2003/0079174 | A1 | 4/2003 | Hooks |
| 2003/0125975 | A1 | 7/2003 | Danz et al. |
| 2003/0126456 | A1 | 7/2003 | Birzer et al. |
| 2003/0159055 | A1 | 8/2003 | Robbins et al. |
| 2003/0163684 | A1 | 8/2003 | Fransdonk |
| 2003/0167236 | A1 | 9/2003 | Stefik et al. |
| 2003/0172035 | A1 | 9/2003 | Cronce et al. |
| 2004/0068734 | A1 | 4/2004 | Bond et al. |
| 2004/0073789 | A1 | 4/2004 | Powers |
| 2004/0162827 | A1 | 8/2004 | Nakano |
| 2005/0015343 | A1 | 1/2005 | Nagai et al. |
| 2005/0039034 | A1 | 2/2005 | Doyle et al. |
| 2005/0060643 | A1 | 3/2005 | Glass et al. |
| 2005/0065930 | A1 | 3/2005 | Swaminathan et al. |
| 2005/0114840 | A1 | 5/2005 | Zeidman |
| 2005/0125358 | A1 | 6/2005 | Levin et al. |
| 2005/0125359 | A1 | 6/2005 | Levin et al. |
| 2005/0166094 | A1 | 7/2005 | Blackwell et al. |
| 2005/0216898 | A1 | 9/2005 | Powell, Jr. et al. |
| 2005/0235342 | A1 | 10/2005 | Ene-Pietrosanu et al. |
| 2006/0015465 | A1* | 1/2006 | Kume et al. .................. 705/59 |
| 2006/0031364 | A1 | 2/2006 | Hamilton et al. |
| 2006/0031686 | A1 | 2/2006 | Atallah et al. |
| 2006/0107070 | A1 | 5/2006 | Rice et al. |
| 2006/0122983 | A1 | 6/2006 | King et al. |
| 2006/0155975 | A1 | 7/2006 | Mueller |
| 2006/0195540 | A1 | 8/2006 | Hamilton et al. |
| 2007/0157311 | A1 | 7/2007 | Meier et al. |
| 2007/0162890 | A1 | 7/2007 | Meier et al. |
| 2007/0299825 | A1 | 12/2007 | Rush et al. |
| 2008/0215897 | A1 | 9/2008 | Doyle et al. |
| 2008/0304669 | A1 | 12/2008 | Bugbee |

OTHER PUBLICATIONS

Cole et al. "Verifying Candidate Matches in Sparse and Wildcard Matching" [online]. Montreal, Quebec, Canada, STOC 02, May 19, 2002—May 21, 2002 [retrieved Oct. 30, 2007]. Retrieved from the Internet: <www.citeseer.org>, 10 pages.

International Search Report for related PCT Application No. PCT/US2007/011022, mailed Nov. 12, 2007, 4 pages.

Kamps et al. "Best Match Querying form DocumentCentric XML" [online]. Seventh International Workshop on the Web and Databases, Amsterdam, Netherlands, (WEBDB 2004), Jun. 17, 2004-Jun. 18, 2004 [retrieved on Oct. 30, 2007]. Retrieved from the Internet: <http://staff.science.uva.n1/{mdr/Publications/Files/webdb2004.pdf>, pp. 55-60.

Meziane et al. "A Document Management Methodology Based on Similarity Contents." Elsevier, 2003, Salford, United Kingdom, Information Sciences vol. 158 (2004), pp. 15-36.

Office Action issued in related U.S. Appl. No. 10/728,173, mailed Jan. 28, 2008, 6 pages.

Office Action issued in related U.S. Appl. No. 10/728,174, mailed Jan. 25, 2008, 10 pages.

Written Opinion for related PCT Application No. PCT/US2004/040453, mailed Jun. 4 ,2006, 6 pages.

Written Opinion for related PCT Application No. PCT/US2006/008369, mailed Sep. 18, 2007, 4 pages.

Written Opinion for related PCT Application No. PCT/US2007/011022, mailed Nov. 12, 2007, 8 pages.

Farringdon, Jill M., Introduction to Analysing for Authorship: A Guide to the Cusum Technique, Retrieved from Website: <http://members.aol.com/qsums/>, Introduction link, web pages dated Oct. 13, 2004, Retrieved via The Wayback Machine: <www.archive.org>, 11 pages.

Invitation Pursuant to Article 94(3) and Rule 71(1) EPC for European Patent Application No. 06737533.7 dated Jun. 2, 2008, 2 pages.

Office Action issued in related U.S. Application No. 11/429,928 mailed Jun. 27, 2008, 14 pages.

Office Action issued in related U.S. Application No. 11/580,220, mailed Jul. 9, 2008, 9 pages.

International Search Report for PCT Application No. PCT/US2007/000272, mailed Nov. 19, 2008, 2 pages.

Written Opinion for PCT Application No. PCT/US2007/000272, mailed Nov. 19, 2008, 5 pages.

Final Office Action issued in related U.S. Appl. No. 10/728,173, mailed Jan. 23, 2009, 11 pages.

Office Action issued in related U.S. Appl. No. 11/429,928 mailed Jan. 27, 2009, 11 pages.

Written Opinion for PCT Application No. PCT/US2007/021648, mailed Jan. 30, 2009, 5 pages.

International Search Report for PCT Application No. PCT/US2007/021648, mailed Jan. 30, 2009, 4 pages.

Notice of Allowance issued in related U.S. Appl. No. 10/728,174 dated Feb. 4, 2009, 11 pages.

"TeleKnowledge" M2 Presswire, Coventry: Jul. 1, 2002, 3 pages.

Office Action issued in related U.S. Appl. No. 11/580,220 mailed Feb. 24, 2009, 8 pages.

Office Action issued in related U.S. Appl. No. 11/326,806 mailed Feb. 26, 2009, 13 pages.

Menezes, Alfred J., "Handbook of Applied Cryptography", copyright 1997 by CRC Press LLC, pp. 22-23.

Examination Report for European Application No. 06737533.7 mailed Aug. 28, 2008, 5 pages.

[fsl-discuss] Automatic reporting of license terms, http://lists.alt.org/pipermail/fsl-discuss/2002-April/000309tml, printed on Nov. 26, 2003, pp. 1-2.

[fsl-discuss] Automatic reporting of license terms, http://lists.alt.org/pipermail/fsl-discuss/2002-April/000312.html, printed on NOv. 26, 2003, pp. 1-2.

A System for Detecting Software Plagiarism, http://cs.berkeley.edu/~aiken/moss.html, Nov. 4, 2005.

Arsenalut et al., Network Working Group Request for Comments: 3157, "Securely Available Credentials-Requirements", http://ftp.rfc-editor.org/innotes/rfc3157.txt, printed on Nov. 26, 2003, pp. 1-19.

Article: How Copyleft Uses License Rights to Succeed in the Open Source Software Revolution and the Implication for Article 2B, HCUL.doc, Oct. 2, 2003, pp. 179-194.

ASAP Software, A Buhrmann Company, 1999-2002 ASAP Software, pp. 1-2.

Cleanscape lint jump page, http://www.cleanscape.net/products/lintonline/login.html, printed on Nov. 26, 2003, p. 1.

Clough, "Plagiarism in natural and programming languages: an overview of current tools and technologies", http://www1.compaq.com/pressrelease/0,1494,wp%7E14583_2lob%7E29892_1_1.00.html, pp. 1-31, Jun. 2000.
Code Analysis Settings, http://www.ascensionlabs.com/pbca_CodeAnalysisSettings.htm, printed on Nov. 26, 2003, p. 1.
Cohen, "Recursive Hashing Functions for *n*-Grams", *ACM Transactions on Information Systems*, 15(3):291-320 (1997).
Creating a LIDESC_TAGS string, www.mibsoftware.com/librock/lidesc/tags.htm, printed on Nov. 26, 2003, pp. 1-9.
Damashek, "Gauging Similarity with n-Grams: Language-Independent Categorization of Text", *Science*, New Series, 267(5199):843-848 (1995).
Eastlake et al, Network Working Group request for Comments: 3174, "US secure Hash Algorithm 1(SHA1)", http://ftp.rfc-editor.org/innotes/rfc3174.txt, printed on Nov. 26, 2003, pp. 1-21.
Fougner, Network Working Group request for Comments: 1170, "Public Key Standards and Licenses", http://ftp.rfc-editor.org/innotes/rfc1170.txt, printed on Nov. 26, 2003, pp. 1-2.
GPL Compliance Toolset, http://www.metrowerks.com/MW/Develop/Embedded/Linux/GPLCT.htm, printed on Nov. 25, 2003, pp. 1-2.
Heckel et al., "A Technique for Isolating Differences Between Files", *Communications of the ACM*, 21(4):264-268 (Apr. 1978).
http://www.mibsoftware.com/librock/lidesc, printed Jul. 18, 2003, pp. 1-23.
Huitema, Network Working Group Request for Comments: 1383, "An Experiment in DNS based IP Routing", http://ftp.rfc-editor.org/innotes/rfc1383.txt, printed on Nov. 26, 2003, pp. 1-14.
Johnson, "Identifying Redundancy in Source Code using Fingerprints", pp. 171-183.
LIDESC: Librock License Awareness System, www.mibsoftware.com/librock/lidesc, printed on Nov. 26, 2003, pp. 1-3.
Lineo launches 'anti-FUD' campaign with license ID tool, http://www.linuxdevices.com/news/NS6538038187.html, printed on Nov. 26, 2003, pp. 1-4.
Linux Dev Center: Lineo's GPL Compliance Tool [Oct. 4, 2001], http://www.oreillynet.com/pub/a/linux/2001/10/04/lineo/html, printed on Nov. 26, 2003, pp. 1-4.
Microsoft Software Asset Management: Microsoft Software Inventory Analyzer, http://www.microsoft.com/resources/sam/msia.mspx, printed on Nov. 26, 2003, p. 1.
New utility helps prevent software license violations [NewsForge], http://linuxdevices.com/news/NS3340825769.html, printed on Nov. 26, 2003, pp. 1-3.
NewsForge/New utility helps prevent software license violations [NewsForge], http://newsforge.com/software02/04/23/163211.shtml?tid=51, printed on Nov. 26, 2003, pp. 1-3.
Open Source Initiative OSI—Certification Mark and Process, http://www.opensource.org/docs/certification_mark.php, printed on Nov. 26, 2003, pp. 1-5.
Open Source Initiative OSI—Licensing, http://www.opensource.org/licenses/index.php, printed on Nov. 26, 2003, pp. 1-2.

Open Source Initiative OSI—The Attribution Assurance License: Licensing, http://www.opensource.org/licenses/attibution/php, printed on Nov. 26, 2003, pp. 1-3.
Open Source Initiative OSI—The Open Source Definition, http://www.opensource.org/docs/definition/php, printed on Nov. 26, 2003, pp. 1-4.
PB Code Analyzer, http://www.ascensionlabs.com/pbcodeanalyzer.htm, printed on Nov. 26, 2003, pp. 1-5.
Pethia et al., Network Working Group Request for Comments: 1281, "Guidelines for the Secure Operation of the Internet", http://ftp.rfc-editor.org/innotes/rfc1281.txt, printed on Nov. 26, 2003, pp. 1-10.
Prechelt et al., "Finding plagiarisms among a set of programs with JPlag", Resubmission to J. of Universal Computer Science, Nov. 28, 2001, http://www.jucs.org/.
Query FTP Software License Database, http://www.uth.tmc.edu/iaims/network/ftp.html, printed on Nov. 26, 2003, p. 1.
Rescorla et al., Network Working Group request for Comments: 2660, "The secure HyperText Transfer Protocol", http://ftp.rfc-editor.org/innotes/frc2660.txt, printed on Nov. 26, 2003, pp. 1-43.
Rivest, Network Working Group Request for Comments: 1321, "The MD5 Message-Digest Algorithm", http://ftp.rfc-editor.org/innotes/rfc1321.txt, printed on Nov. 26, 2003, pp. 1-2.
Schleimer et al., "Winnowing: Local Algorithms for Document Fingerprinting", pp. 76-85.
Si et al., "CHECK: A Document Plagiarism Detection System", pp. 70-77.
TapTop Folder, http://www.systemconsulting.co.uk/index.php?page=software/products/writeme.html, printed on Nov. 26, 2003, p. 1.
TapTop Folder, http://www.systemconsulting.co.uk/index,php?page=software/products.html, printed on Nov. 26, 2003, p. 1.
TapTop Folder, http://www.systemconsulting.co.uk/index.php?page=software/products/licensedb.html, printed on Nov. 26, 2003, p. 1.
Various Licenses and Comments about Them—GNU Project-Free Software Foundation (FSF), http://www.fsf.org/licenses/license-list.html, printed Nov. 26, 2003, pp. 1-15.
Verco et al., "Plagiarism á la Mode: A Comparison of Automated Systems for Detecting Suspected Plagiarism", *The Computer Journal*, 39(9):741-750 (1996).
Whale, "Identification of Program Similarity in Large Populations", *The Computer Journal*, 33(2):140-146 (1990).
Wise et al., "YAP3: Improved Detection of Similarities in Computer Program and Other Texts," ACM SIGCSE Bulletin, vol. 28 No. 1, p. 130-134, Mar. 1996, pp. 130-134.
"News—Motorola picks Lineo for set-top box," ZDNet UK, Aug. 29, 2001, [retrieved Nov. 26, 2003], Retrieved from the Internet: <http://news.zdnet.co.uk/hardware/emergingtech/039020357,2093969,00.htm>, pp. 1-3.

\* cited by examiner

METHODS AND SYSTEMS FOR IDENTIFYING AN AREA OF INTEREST IN PROTECTABLE CONTENT

TECHNICAL FIELD

The invention generally relates to the analysis of protectable content. More particularly, the invention relates to methods and systems for identifying an area of interest in protectable content based on an inspection of the protectable content.

BACKGROUND

Digital documents, files, and media may all be easily copied. Such copying of information may not be immediately apparent on its face; however, such copying can often prove to be problematic if it is initially undetected, but later discovered by a party having legal rights in the copied information.

To take an example, unlike in traditional software development environments where a single entity controls the entire development of a software element, in collaborative development environments, the software elements being developed are shared among a variety of entities. Accordingly, when one develops software in a collaborative environment, copying is more difficult to detect. As such, the risk that the legal rights of another entity will be infringed, for example by developers illegally importing the other entity's constituent software elements into their aggregated software product, is increased.

An entity providing a constituent software element can, for example, form licenses that explicitly set forth the rights, obligations, restrictions, and/or prohibitions governing the constituent software element's use within an aggregated software product. While this may alleviate some of the uncertainty associated with incorporating a constituent software element into an aggregated software product, collaborative developers nevertheless still have an interest in tracking the use and/or copying of constituent software elements to further mitigate the risk of infringing another's legal rights in the constituent software element.

SUMMARY OF THE INVENTION

The present invention relates to methods and systems for identifying an area of interest in protectable content. The protectable content may be, for example, one or more of a software element (e.g., a source code file and/or an object code file), a multimedia presentation, a video segment, an audio segment, a textual representation, a work of art, a visual representation, a technological know-how, a business know-how, and a contract right that is/are legally-protectable under patent law, copyright law, trademark law, trade secret law, contract law, and/or under other bases. The area of interest in the protectable content may be a section of the protectable content that is suspected of having been copied, that is likely to have been copied, and/or that is identified as having been copied, or may be a section of the protectable content that is of interest for other reasons.

Embodiments of the present invention facilitate the inspection of the protectable content and the subsequent identification of areas of interest in the protectable content, such as areas suspected of having been copied. For example, the present invention employs two or more different techniques for inspecting the protectable content in order to minimize false-positive identifications of copying. Once an area of interest in the protectable content is identified, the present invention facilitates the determination of supplemental information from the area of interest, and also facilitates further processing and decision making based on what is gleaned from the area of interest and the supplemental information.

In one aspect, the invention features a method of identifying an area of interest in protectable content. In accordance with the method, a first technique is used to inspect the protectable content, a second technique different than the first technique is used to again inspect the protectable content, and an area of interest is identified based on the inspection using the first technique and the inspection using the second technique.

Various embodiments of this aspect of the invention include the following features. The protectable content may be source code and/or object code. Moreover, the protectable content may be generated by decompiling object code, by compiling source code, and/or by decompressing compressed content.

In one embodiment, one of the first technique and the second technique inspects tokens in the protectable content. In other embodiments, one of the first technique and the second technique inspects the structure of the protectable content, the flow of execution of the protectable content, copyright notices in the protectable content, license information in the protectable content, license text in the protectable content, sections of text in the protectable content, and/or symbol tables in the protectable content. In doing so, one of the first technique and the second technique may determine the protectable content to lack copyright notices, to lack license information, and/or to lack license text.

In still other embodiments, one of the first technique and the second technique inspects the protectable content for certain file names, for certain file types, and/or for specific text strings. In inspecting the protectable content for specific text strings, one of the first technique and the second technique may filter its inspection.

In another embodiment, the method further includes determining supplemental information for the area of interest. In general, the supplemental information may be, for example, one or more of adjacent text, adjacent content, adjacent code, file header information, project information, product information, component information, directory information, and licensing information. In some particular embodiments, however, the method further includes determining the area of interest to have been copied from a specific source. In such cases, the supplemental information may be one or more of an identification the specific source, project information associated with the area of interest or the specific source, licenses associated with the area of interest or the specific source, and licensing information associated with the area of interest or the specific source.

In yet another embodiment, the method further includes taking an action based on one or more of the area of interest and the supplemental information. For example, the action may include grouping the area of interest and the supplemental information. Alternatively, the action may be one or more of displaying information for a user and prompting a user for supplemental information.

In still another embodiment, the method further includes inspecting the protectable content using a third technique different than the first technique and the second technique. In this embodiment, identifying the area of interest is further based on the inspection using the third technique. The method may also further include inspecting the protectable content using a fourth technique different than the first technique, the second technique, and the third technique. In such a case, identifying the area of interest is further based on the inspection using the fourth technique.

In a further embodiment, the inspections of the protectable content using the first technique and using the second technique reveal no indications of copying in a section of the protectable content. In such an embodiment, that section of the protectable content is identified as the area of interest.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

Figure 1:
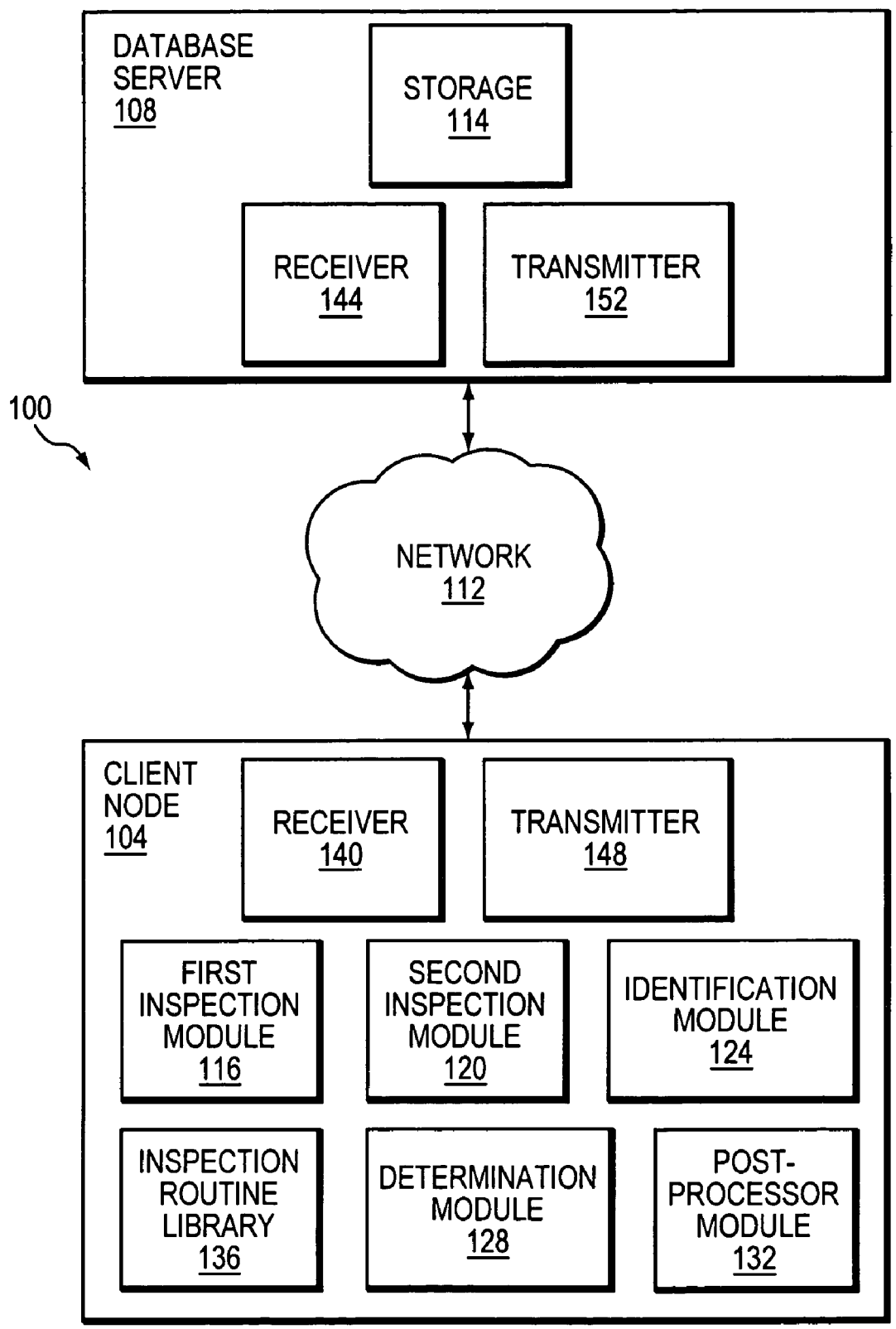
FIG. 1 is a block diagram of an illustrative embodiment of a system for identifying an area of interest in protectable content in accordance with the invention.

In general, the present invention pertains to methods and systems for identifying an area of interest in protectable content. In broad overview, in accordance with one aspect of the invention, a first computing device, for example a developer node, communicates with a second computing device, for example a database node, over a network. The first computing device has or is provided with a protectable content, for example source code or object code, or itself generates a protectable content, for example by decompiling object code, by compiling source code, or by decompressing a compressed content. The first computing device then inspects the protectable content using at least two different techniques. In one embodiment, the results yielded from the inspection are communicated to the second computing device for comparison against a collection of information, such as, for example, a database of information. The results from the comparison against the collection of information, which may be indicative of one or more areas of interest in the protectable content, are then communicated to the first computing device. In one embodiment, the first computing device then identifies one or more areas of interest in the protectable content. The one or more areas of interest may then be used by the first computing device to perform further operations and/or may be displayed to a user of the first computing device.

In one non-limiting example, the protectable content is computer source code. The source code may have been developed using the first computing device, may be provided to the first computing device from, for example, a disk, a CD, a network communication, or other means, may be generated by the first computing device by decompiling object code provided to the first computing device, or may be generated by the first computing device by decompressing a compressed content provided to the first computing device, such as a zip file. A user of the first computing device may wish, for example, to know whether the source code includes any copied "open source" code. Accordingly, the user may cause the first computing device to inspect the source code using at least two different techniques. One technique may be to evaluate a hash function to generate a hash value for the source code or, more typically, hash values for discrete subsets of the source code. A second technique may be to inspect the source code to select specific text strings. The hash value(s) and text strings may then be communicated to a second computing device. In this example, the second computing device may be a database server storing a collection of hash values for subsets of open source code and a collection of text strings typically found in open source code. The hash value(s) and text strings communicated to the second computing device from the first computing device are then compared against the collections stored in the database server. The results from the comparison may be indicative of one or more areas of interest in the source code, such as, for example, a matching hash value and/or a matching text string. The results from the comparison are then communicated to the first computing device. The first computing device then identifies one or more areas of interest in the source code that are indicative of copied open source code. The first computing device may then use the areas of interest in the source code to perform further operations and may also display the areas of interest to the user of the first computing device.

FIG. 1 depicts a system 100 for identifying an area of interest in protectable content according to an illustrative embodiment of this aspect of the invention. The system 100 includes a first computing device, client node 104, in communication with a second computing device, database server 108, over a network 112. The network 112 may be, for example, a local-area network (LAN), such as a company Intranet, or a wide area network (WAN), such as the Internet or the World Wide Web. Users of the client node 104 may be connected to the network 112 through a variety of connections including, but not limited to, standard telephone lines, LAN or WAN links (e.g., T1, T3, 56 kb, X.25), broadband connections (e.g., ISDN, Frame Relay, ATM), or wireless connections. The connections, moreover, may be established using a variety of communication protocols (e.g., HTTP, TCP/IP, IPX, SPX, NetBios, Ethernet, RS232, and direct asynchronous connections). Alternatively, in another embodiment (not shown), the database server 108 is local to the client node 104 and the two may communicate directly without the use of the network 112. In yet another embodiment (not shown), the functionality of the client node 104 and the database server 108 is included on a single computing device.

The client node 104 may be any personal computer, Windows-based terminal, Network Computer, wireless device, information appliance, RISC Power PC, X-device, workstation, mini computer, main frame computer, personal digital assistant, set top box, handheld device, or other computing device that is capable of both presenting information/data to, and receiving commands from, a user of the client node 104. For example, the client node 104 may include a visual display device (e.g., a computer monitor), a data entry device (e.g., a keyboard), persistent and/or volatile storage (e.g., computer memory), a processor, and a mouse. In one embodiment, the client node 104 includes a web browser, such as, for example, the Internet Explorer™ program developed by the Microsoft Corporation of Redmond, Wash. to connect to the World Wide Web. In one particular embodiment, the client node 104 is a developer node used to develop, generate, and/or store computer code, which is one exemplary type of protectable content. More generally, however, the client node 104 may be any type of computing node used to develop, generate, and/or store any type of protectable content.

For its part, the database server 108 may be any computing device capable of delivering information/data to, and receiving commands from, the client node 104. The database server 108 may include storage 114, or storage 114 may be connected to the database server 108, for storing and managing collections of data. The database server 108 may communicate using SQL or another language, or may use other techniques to store and receive data. In addition, as mentioned above, the database server 108 may be resident on the client node 104 or, as shown in FIG. 1, it may be separate from the client node 104.

In one embodiment, the client node 104 includes a first inspection module 116 for inspecting the protectable content using a first technique, a second inspection module 120 for inspecting the protectable content using a second technique that is different from the first technique, and an identification module 124 for identifying an area of interest in the protectable content based on the inspection using the first technique and the inspection using the second technique. Optionally, the client node 104 may also include a determination module 128 for determining supplemental information for the area of interest, a post-processor module 132 for taking an action based on one or more of the area of interest and the supplemental information, and an inspection routine library 136 for storing inspection routines used by the first and second inspection modules 116, 120. As illustrated in FIG. 1, the client node 104 and the database server 108 may each also include a receiver 140, 144 and a transmitter 148, 152 for communicating over the network 112 with one another.

The first inspection module 116, the second inspection module 120, the identification module 124, the determination module 128, and the post-processor module 132 may each be implemented as any software program and/or hardware device, for example an application specific integrated circuit (ASIC) or a field programmable gate array (FPGA), that is capable of achieving the functionality described below. Where the first inspection module 116 and the second inspection module 120 are each implemented as a software program, they may each load an appropriate, but different, inspection routine from the inspection routine library 136 to inspect the protectable content at issue. Alternatively, in another embodiment, the first inspection module 116 and the second inspection module 120 are implemented as software programs that are preprogrammed with their own, but different, inspection routines and the inspection module 136 is not used. In still another embodiment, where the first inspection module 116 and the second inspection module 120 are each implemented as a hardware device, the inspection routine library 136 is either not used or is replaced by further hardware devices for use in connection with the first and second inspection modules 116, 120.

It should also be understood that two or more of the modules 116, 120, 124, 128, and 132 may be combined into a single module, such that the functions performed by the two or more modules, as described below, are in fact performed by the single module. In addition, it should be understood that any single one of the modules 116, 120, 124, 128, and 132 may be implemented as multiple modules, such that the functions performed by any single one of the modules 116, 120, 124, 128, and 132, as described below, are in fact performed by the multiple modules.

For their part, each receiver 140, 144 and transmitter 148, 152 may be any hardware device, or software module with a hardware interface, that is capable of receiving and transmitting, respectively, communications, including requests, responses, and commands, such as, for example, inter-processor communications and networked communications. In another embodiment, the functions performed by the client node receiver 140 and by the client node transmitter 148 may be performed by a single client node transceiver (not shown). Similarly, the functions performed by the database server receiver 144 and by the database server transmitter 152 may be performed by a single database server transceiver (not shown).

Figure 2:
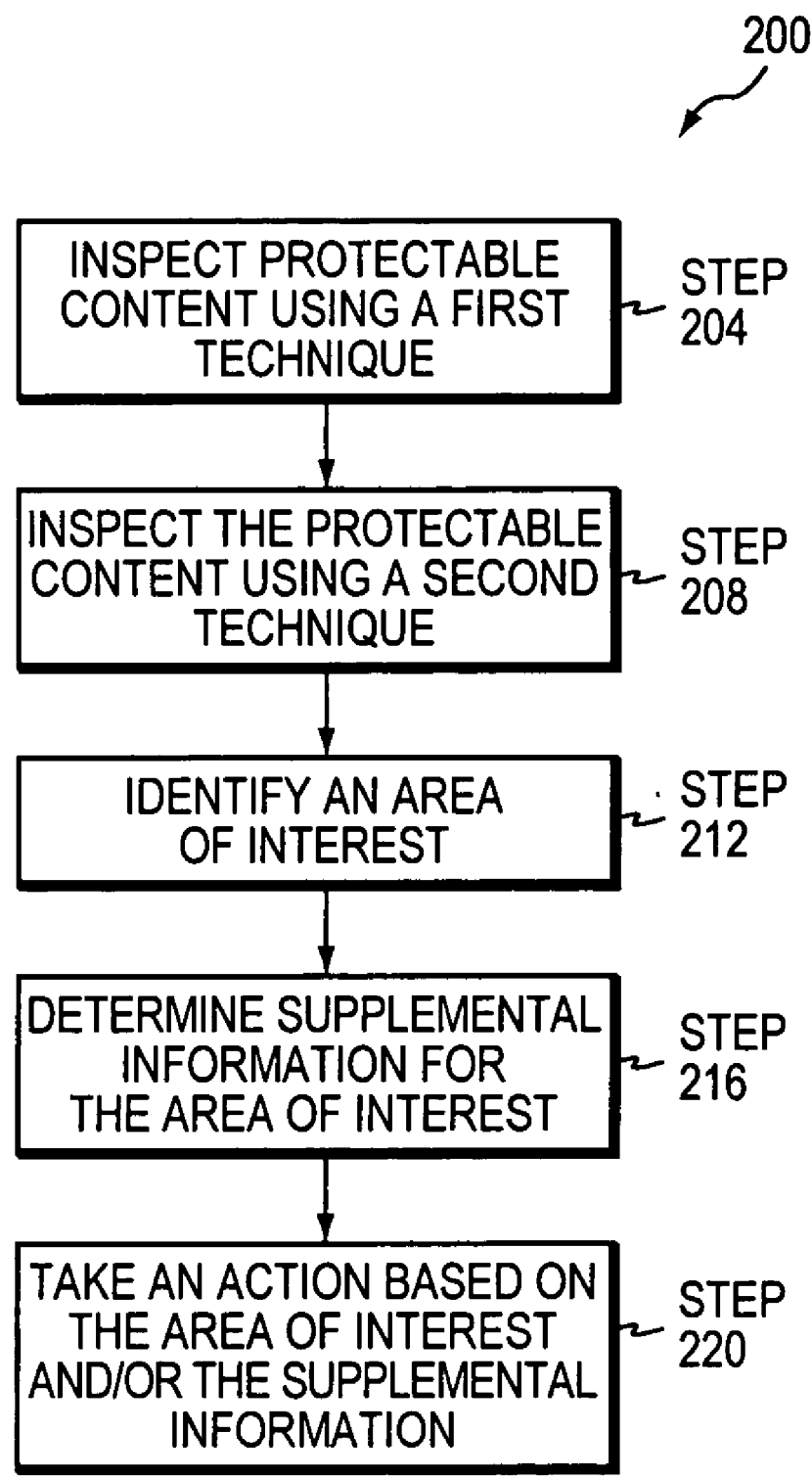
FIG. 2 is a flow diagram of an illustrative embodiment of a method for identifying an area of interest in protectable content in accordance with the invention.

In one embodiment of a method 200 for identifying an area of interest in protectable content, for example using the system 100 of FIG. 1, a first technique is used at step 204 to inspect the protectable content, a second technique different than the first technique is used at step 208 to again inspect the protectable content, and an area of interest in the protectable content is identified at step 212 based on the inspection using the first technique and the inspection using the second technique. Optionally, the method 200 may also include determining, at step 216, supplemental information for the area of interest and taking, at step 220, an action based on one or more of the area of interest and the supplemental information. In addition, while not illustrated in FIG. 2, the method 200 may include further steps between steps 208 and 212 for inspecting the protectable content using a third, fourth, and further techniques. The results obtained from performing these steps may also be considered at step 212 in identifying the area of interest.

In greater detail, prior to performing step 204 of the method 200, the client node 104 of the system 100 is provided with, or generates, a protectable content. In one non-limiting example, the protectable content is computer code, such as source code, object code, or both. The computer code may have been, for example, developed using the client node 104, or may have been provided to the client node 104 from, for example, a disk, a CD, a communication across the network 112, or other means. In one particular embodiment, the protectable content is source code that is generated at the client node 104 by decompiling object code. In another embodiment, the protectable content is object code that is generated at the client node 104 by compiling source code. In yet another embodiment, the protectable content is generated by the client node 104 by decompressing a compressed content provided to the client node 104, such as a compressed content included in a zip file. In still other embodiments, the client node 104 generates the protectable content by translating computer code written in one programming language to computer code written in another programming language, and/or by normalizing (e.g., by de-optimizing and/or de-obfuscating) the computer code. In a further embodiment, the client node 104 extracts comments from a source code file to generate the protectable content. As another example, given a file that contains both textual information and binary information, the client node 104 may extract either the textual information or the binary information from the other to generate protectable content.

Once the client node 104 of the system 100 is provided with, or generates, a protectable content, the first inspection module 116 of the client node 104 inspects, at step 204, the protectable content using a first technique. Similarly, at step 208, the second inspection module 120 of the client node 104 inspects the protectable content using a second technique. The second technique used by the second inspection module 120 is, however, different from the first technique used by the first inspection module 116.

In one embodiment, the second technique is used to inspect the protectable content subsequent to the first technique being used to inspect the protectable content. Alternatively, the use of the second technique may overlap the use of the first technique. In still another embodiment, the first and second techniques may be used substantially simultaneously to inspect the protectable content.

Any suitable technique that is helpful in identifying an area of interest may be used by the first and second inspection modules 116, 120 to inspect the protectable content at steps 204, 208 of the method 200. Some of the techniques may involve the use of a database server 108; others may not.

Various embodiments of the techniques are described below. It should be understood, moreover, that the features of the various techniques described below are not mutually exclusive and can exist in various combinations and permutations, even if such combinations or permutations are not made express herein, without departing from the spirit and scope of the invention. For example, one technique may be used by one inspection module 116 and another technique may be used by another inspection module 120.

In one embodiment, an inspection module 116, 120 may inspect tokens in the protectable content. Where the protectable content is computer code, the inspection module 116, 120 may inspect tokens derived from the source code or from the object code of the computer code. The tokens can take a variety of forms. For example, in one implementation, the inspection module 116, 120 may break the source code or object code down into discrete subsets of code and then, for each discrete subset of code, may evaluate a hash function to generate a hash value. The generated hash values may then be transmitted, using the client node transmitter 148, via the network 112 to the database server receiver 144 for comparison against a collection of known hash values for discrete subsets of code. The database server 108 then compares the hash values received from the client node 104 against its collection of hash values stored in the storage 114 and notifies (via the database server transmitter 152, the network 112, and the client node receiver 140) the client node 104 of any matches.

In another exemplary implementation using tokens, the inspection module 116, 120 generates a token for each word, or symbol, in computer code. Each word or symbol has an assigned token. The code is thus translated to tokens, which tokens are then compared, for example individually or in proximate groups, to determine if there are matches.

In another exemplary implementation, the inspection module 116 generates a token for each item in the code, in a manner similar to tokens generated by a compiler. For example, each token may include a pair of integers, where the first integer is the class of token representing a code element (e.g., START, END, FUNCTION CALL, SYMBOL, CONSTANT, LITERAL, OPERATION, etc.) and the second integer identifies the member of the class (e.g., for class OPERATION, members can include without limitation ADD, SUBTRACT, COMPARE; and for class SYMBOL, the token member might be the string name of the symbol, or an identifier assigned to the string name). The tokens that are generated may then be compared to stored tokens to determine whether a match has occurred, for example individually or in adjacent or nearby token groups. In some embodiments, for some symbol classes, only the token class types are compared. For example, for CONSTANT and LITERALS, it may be enough to know that a CONSTANT occupied a location between an OPERATION/ADD token and an OPERATION/ MULTIPLY token. The combination of some token members, in proximity to some token classes, for example, may be indicative of a match that would signify an area of interest. Use of this technique enables an inspection module to identify code that is functionally equivalent, but has been subject to non-functional, textual changes such as a global search and replace of variable names.

As another example, for Java code, the code may be compiled into bytecode tokens, and the compiled bytecode tokens compared. Although the compiled output may be compiler specific, if the same Java compiler is used to generate the tokens that are used for comparison, any anomalies due to compiler differences can be minimized. As in the example above, if desired, steps can be taken to minimize the impact of any non-functional, textual differences, such that the comparison focuses on functional similarity as represented in a group of adjacent or nearby tokens.

In one embodiment, an inspection module 116, 120 may inspect the structure of the protectable content. For example, for a source code file or an object code file, the inspection module 116, 120 may inspect the code, or subsets thereof, and generate representations of how the code is structured (e.g., representations of what certain routines, sub-routines, functions, loops, etc. use as parameters, variables, constants, etc.). The generated representations may then be transmitted to the database server 108 for comparison against a collection of known source code or object code structure representations. Again, the database server 108 compares the structure representations received from the client node 104 against its collection of structure representations and notifies the client node 104 of any matches.

In one embodiment, an inspection module 116, 120 may inspect the flow of execution of the protectable content. For example, for a source code file or an object code file, the inspection module 116, 120 may inspect the code, or subsets thereof, and generate representations of the order in which discrete sections of the code (e.g., routines, sub-routines, functions, loops, etc.) are found and/or will be executed. The generated representations may then be transmitted to the database server 108 for comparison against a collection of known source code or object code flow of execution representations. If there are any matches, the database server 108 may notify the client node 104.

In one embodiment, an inspection module 116, 120 may inspect copyright notices in the protectable content. For example, for a source code file or an object code file, the inspection module 116, 120 may inspect the file and reproduce all copyright notices identified therein. The inspection module 116, 120 may identify such copyright notices by, for example, searching the file in a non-case-sensitive manner for the text string "copyright," searching the file in a non-case-sensitive manner for the text string "all rights reserved," searching the file in a non-case-sensitive manner for the text string "(c)," or searching the file for the symbol "©." The reproduced copyright notices may then be transmitted to the database server 108 for comparison against a collection of known copyright notices. If there are any matches, the database server 108 may notify the client node 104.

In one embodiment, rather than being configured to search the source code or object code for all instances of a copyright notice, an inspection module 116, 120 may be configured to search the source code or object code for specific copyright notices. In such an embodiment, the database server 108 need not be involved. For example, to identify copying from a specific source, such as from the XYZ Corporation's 2005 software code, a user of the client node 104 may employ the inspection module 116, 120 to search the source code or object code for non-case-sensitive text strings such as "XYZ Corporation," "Copyright 2005 by XYZ Corporation," or "© 2005 by XYZ Corporation." The inspection module 116, 120 may then record any matches in, for example, the memory (not shown) of the client node 104 for later use.

By using the inspection module 116, 120 to search for copyright notices, the source code or object code may be found to lack copyright notices. Such information may be employed by the user, optionally along with other information known to the user, to determine either a lack of copying from certain sources or copying from certain sources coupled with a removal of the copyright information from those sources. In other words, the absence of copyright notices in the source code or object code may also be conspicuous and indicative of an area of interest.

In one embodiment, an inspection module 116, 120 may inspect license information in the protectable content. For example, for a source code file or an object code file, the inspection module 116, 120 may inspect the file to identify all instances where license information appears. The inspection module 116, 120 may then reproduce certain license information from the identified instances, such as, for example, identifications of the licenses themselves and/or the types of the licenses, the original sources from which certain sections of the code were purportedly licensed, the scopes of the licenses, the durations of the licenses, the payments to be made under the licenses, or combinations thereof. The reproduced license information may, for example, be transmitted to the database server 108 for comparison against a collection of known license information. If there are any matches, the database server 108 may notify the client node 104.

In one embodiment, an inspection module 116, 120 may inspect license text in the protectable content. For example, for a source code file or an object code file, the inspection module 116, 120 may inspect the file to identify all instances where license text appears. The inspection module 116, 120 may then reproduce all or certain portions of the license text from the identified instances. The reproduced license text may then be transmitted to the database server 108 for comparison against a collection of known license text. If there are any matches, the database server 108 may notify the client node 104.

In one embodiment, rather than being configured to search the source code or object code for all instances of license information or license text, an inspection module 116, 120 may be configured to search the source code or object code for specific license information or license text. In such an embodiment, the database server 108 need not be involved. For example, if a user of the client node 104 suspects copying from a specific source, say the XYZ Corporation, the user may employ the inspection module 116, 120 to search the source code or object code for specific license information or license text found in the appropriate software license of the XYZ Corporation. The inspection module 116, 120 may then record any matches in, for example, the memory (not shown) of the client node 104 for later use.

Again, by using the inspection module 116, 120 to search for license information or license text, the source code or object code may be found to lack license information or license text. Such a discovery may be employed by the user, optionally along with other information known to the user, to determine either a lack of copying from certain sources or copying from certain sources coupled with a removal of license information and license text from those sources. In other words, the absence of license information or license text in the source code or object code may also be conspicuous and indicative of an area of interest.

In one embodiment, an inspection module 116, 120 may inspect the protectable content for specific text strings. For example, for a source code file, the inspection module 116, 120 may inspect the file to identify the presence or absence of certain text strings, such as, for example, "Microsoft," "Eclipse," "Oracle," and "fsf.org." For an object code file, the inspection module 116, 120 may employ a hexadecimal translator to inspect the file and identify the presence or absence of certain text strings in constants. Having identified certain specific text strings, the inspection module 116, 120 may then, for example, reproduce the text strings and transmit them to the database server 108 for comparison against a collection of known text strings. If there are any matches, the database server 108 may notify the client node 104.

In one embodiment, an inspection module 116, 120 may filter its identification of specific text strings in the protectable content and may also filter its query to the database server 108. For example, for a source code file, the inspection module 116, 120 may filter or restrict its identification of specific text strings to those which occur only in the comments or, alternatively, to those which occur only in the code. Moreover, the inspection module 116, 120 may filter or restrict its identification of specific text strings to those text strings that occur only in string constants or to those that occur only in the lowercase, and may treat all white-spaces, no matter how long, as equal. The query to the database server 108 for a specific text string match may also be filtered as such.

In one embodiment, rather than inspecting the protectable content for specific text strings, an inspection module 116, 120 reproduces larger sections of text from the protectable content, for example from the source code, and transmits the reproduced sections of text to the database server 108 for comparison against a collection of known text sections. If there are any matches, the database server 108 may notify the client node 104.

In one embodiment, an inspection module 116, 120 may inspect the protectable content for the presence of certain file names and/or for the presence of certain file types. In such an embodiment, the database server 108 need not be involved. For example, the protectable content may include a number of files and an inspection module 116, 120 may be employed to search a directory of the protectable content for a particular file name or a particular file type. An inspection module 116, 120 may also be employed to search the content of each file, or of a subset of the files, forming the protectable content for references to a particular file name or to a particular file type. If, for example, a user of the client node 104 suspects copying from a particular file or a particular file type, the user may employ the inspection module 116, 120 to search the directory of the protectable content for that particular file/file type. Alternatively, the user may employ the inspection module 116, 120 to search the content of each file, or of a subset of the files, forming the protectable content for references to the particular file name or particular file type. The inspection module 116, 120 may then record any matches in, for example, the memory (not shown) of the client node 104 for later use.

In one embodiment, where the protectable content is an object code file, an inspection module 116, 120 may inspect the object code file to identify its symbol tables. Having identified the object code file's symbol tables, the inspection module 116, 120 may then reproduce the symbol tables themselves, or, alternatively, only its symbols, and transmit them to the database server 108 for comparison against a collection of known symbol tables or symbols. If there are any matches, the database server 108 may notify the client node 104.

In one embodiment, a user of the client node 104 may perform either step 204 or step 208, or both step 204 and step 208, manually without the use of an inspection module 116, 120. For example, the user may manually search a directory of the protectable content for suspicious files (e.g., files thought to be copied), may manually search the content of each file forming the protectable content, or a subset thereof, for suspicious content (e.g., content thought to be copied), may manually search the directory of the protectable content for suspicious structures, and/or may manually search certain files forming the protectable content for suspicious structures. The directory of the protectable content may be thought to have a suspicious structure when, for example, files having copyright information included therein are present (e.g., a filed called LICENSING or COPYING), or when directory names typically used in a particular project are present. For example, software projects may have a recognizable directory tree format for source code, and use of that format may be indicative of use of code from that project. For example, an Eclipse project to a plug-in called "x" might typically have files called x.jar, xscr.zip, and plugin.xml in a directory. Observing files in this structure thus might indicate an area of interest, if Eclipse plug-ins were indicative of an area of interest. For their part, the files forming the protectable content may be thought to have a suspicious structure when, for example, they employ data structures typically found in open source code, they employ scripts typically used in open source code, they include, for example in the comments so that it does not compile, code from other programming languages, and/or they include variables or other items that have been obfuscated. The user may then provide a record of any such files, contents, and/or structures thought to be suspicious to, for example, the memory of the client node 104 for later use, for example with another technique.

Following the inspection of the protectable content using the two different techniques, the identification module 124 of the client node 104 identifies, at step 212, at least one area of interest in the protectable content. In one embodiment, each area of interest is identified based on the results of the inspection using the first technique and the results of the inspection using the second technique. For example, in one embodiment, the identification module 124 compares the matches returned by the database server 108, the matches recorded by the inspection module 116, 120, and/or any results inputted from the user's manual review of the protectable content to identify each area of interest. Each area of interest may be identified, for example, by determining those areas identified as suspicious (e.g., as having a matching hash value, as including a matching text string, as including matching copyright information, etc.) by both the first technique and the second technique. Alternatively, each area of interest may be identified by determining those areas identified as suspicious by one of the first and second techniques and not ruled out by the other. For example, an area of a source code file or an object code file may be identified by the first technique as having matching text strings, and may also be found by the second technique to lack copyright notices, licensing information, or license text. In such a case, the identification module 124 may identify that area of the source code file or the object code file as an area of interest.

Alternatively, in another embodiment, a section of the protectable content, for example a file, could be identified as an area of interest for the reason that none of the techniques used to inspect that section of the protectable content resulted in any matches returned by the database server 108 or in any matches recorded by the inspection modules 116, 120. In other words, the absence of any indication of copying in a certain section of the protectable content could cause it to be identified as an area of interest. In such an embodiment, one could, for example, manually review that section of the protectable content or further review that section using techniques not previously used.

Optionally, after the identification module 124 identifies an area of interest at step 212, the determination module 128 may determine, at step 216, supplemental information for the area of interest. In certain embodiments in accordance with the invention, the area of interest in the protectable content will be determined to have been copied from a specific source, or to have been copied from one of a number of specific sources. In such embodiments, the supplemental information for the area of interest may include an identification of the one or more potential files from which the area of interest may have been copied. In addition, the supplemental information may include the project information, licenses, and licensing information associated with the file including the area of interest, and the project information, licenses, and licensing information associated with the files from which the area of interest may have been copied.

In other embodiments in accordance with the invention, the area of interest in the protectable content will be thought to be of interest, but no specific source or number of specific sources identified. For example, there may be characteristics that warrant attention, but no specific match. In such embodiments, the determination module 128 may extract as supplemental information the text, content, or code that surrounds, or is adjacent to, the area of interest in the file. Additionally, the determination module 128 may extract as supplemental information the file header information, the directory information for the directory in which the file is stored, information identifying who last checked the file in, and/or the project, product, or component information associated with that file. As another example, the licensing information contained within the file, or the licensing information associated with the content of the file, may be extracted by the determination module 128 as supplemental information. A variety of other information, such as the entire file itself or other files associated in some manner with the file of interest, may also be extracted by the determination module 128 as supplemental information.

Following the determination of the supplemental information, the post-processor module 132 of the client node 104 may take an action at step 220 based on the area of interest and/or the supplemental information. For example, in one embodiment, the post-processor module 132 groups at step 220 the area of interest and the supplemental information in a useful manner for presentation to the user of the client node 104. Where more than one area of interest is identified at step 212, each area of interest and its determined supplemental information may be further grouped together with information identifying, for example, the file in which the area of interest is located, the license that purportedly governs the use of the portion of the protectable content in which the area of interest is located, and the project with which the area of interest is associated.

In one embodiment, the post-processor module 132 displays information for a user of the client node 104, prompts the user for further information, and/or takes another action with or without the user's direction at step 220. For example, the post-processor module 132 may first display the area of interest and the supplemental information for the user, then prompt the user for further information, and/or take action autonomously or at the user's direction. The post-processor module 132 may, for example, with or without the user's direction, print out the information displayed for the user (e.g., the areas of interest and their determined supplemental information), download files over the network 112 from which the areas of interest are thought to be copied and thereby enable a means of comparison, decide whether the area of interest is original or copied work, send the area of interest and/or supplemental information to a lawyer via, for example, an e-mail over the network 112, report the area of interest and/or supplemental information to another person, link the area of interest and/or supplemental information into appropriate areas of the company's finance system, and/or resolve other issues.

Accordingly, in addition to other advantages, the present invention facilitates the inspection of protectable content by employing two, three, four, or more different inspection techniques, facilitates the identification of areas of interest in the protectable content, such as areas suspected of having been copied, facilitates the determination of supplemental information from the area of interest, and also facilitates further processing and decision making based on what is gleaned from the area of interest and the supplemental information.

It should also be noted that the present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. An article of manufacture storing computer readable instructions thereon to identify copied content, the article of manufacture comprising:
   instructions to inspect content in a first source of protectable content using a first technique;
   instructions to inspect the content in the first source of protectable content using a second technique different than the first technique; and
   instructions to identify the inspected content as a partial copy of a second source of content based on the inspection using the first technique and the inspection using the second technique,
   wherein the first technique and second technique do not rely on a digital watermark added to the second source specifically for the tracking of the content of the second source.

2. The article of manufacture of claim 1 further comprising instructions to determine supplemental information for the content identified as a partial copy of a second source of content.

3. The article of manufacture of claim 2, wherein the supplemental information is one or more of adjacent text, adjacent content, adjacent code, file header information, project information, product information, component information, directory information, and licensing information.

4. The article of manufacture of claim 2 further comprising instructions to determine the content identified as a partial copy of a second source of content to have been copied from a specific source.

5. The article of manufacture of claim 4, wherein the supplemental information is one or more of an identification of the specific source, project information associated with the content identified as a partial copy of a second source of content or the specific source, licenses associated with the content identified as a partial copy of a second source of content or the specific source, and licensing information associated with the content identified as a partial copy of a second source of content or the specific source.

6. The article of manufacture of claim 2 further comprising instructions to take an action based on one or more of the content identified as a partial copy of a second source of content and the supplemental information.

7. The article of manufacture of claim 6, wherein the action comprises instructions to group the content identified as a partial copy of a second source of content and the supplemental information.

8. The article of manufacture of claim 6, wherein the action is one or more of instructions to display information for a user and instructions to prompt a user for supplemental information.

9. The article of manufacture of claim 1, wherein the inspected content is source code.

10. The article of manufacture of claim 1, wherein the inspected content is object code.

11. The article of manufacture of claim 1, wherein one of the instructions to inspect using the first technique and instructions to inspect using the second technique are instructions to inspect tokens in the protectable content.

12. The article of manufacture of claim 1, wherein one of the instructions to inspect using the first technique and instructions to inspect using the second technique are instructions to inspect the structure of the protectable content.

13. The article of manufacture of claim 1, wherein one of the instructions to inspect using the first technique and instructions to inspect using the second technique are instructions to inspect the flow of execution of the protectable content.

14. The article of manufacture of claim 1, wherein one of the instructions to inspect using the first technique and instructions to inspect using the second technique are instructions to identify copyright notices in the protectable content.

15. The article of manufacture of claim 1, wherein one of the instructions to inspect using the first technique and instructions to inspect using the second technique are instructions to determine the absence of copyright notices in the protectable content.

16. The article of manufacture of claim 1, wherein one of the instructions to inspect using the first technique and instructions to inspect using the second technique are instructions to identify license information in the protectable content.

17. The article of manufacture of claim 1, wherein one of the instructions to inspect using the first technique and instructions to inspect using the second technique are instructions to determine the absence of license information in the protectable content.

18. The article of manufacture of claim 1, wherein one of the instructions to inspect using the first technique and instructions to inspect using the second technique are instructions to identify license text in the protectable content.

19. The article of manufacture of claim 1, wherein one of the instructions to inspect using the first technique and instructions to inspect using the second technique are instructions to determine the absence of license text in the protectable content.

20. The article of manufacture of claim 1, wherein one of the instructions to inspect using the first technique and instructions to inspect using the second technique are instructions to inspect sections of text in the protectable content.

21. The article of manufacture of claim 1, wherein one of the instructions to inspect using the first technique and instructions to inspect using the second technique are instructions to inspect the protectable content for specific text strings.

22. The article of manufacture of claim 21, wherein one of the instructions to inspect using the first technique and instructions to inspect using the second technique are instructions to filter the inspection of the protectable content for specific text strings.

23. The article of manufacture of claim 1, wherein one of the instructions to inspect using the first technique and instructions to inspect using the second technique are instructions to inspect the protectable content for certain file names.

24. The article of manufacture of claim 1, wherein one of the instructions to inspect using the first technique and instructions to inspect using the second technique are instructions to inspect the protectable content for certain file types.

25. The article of manufacture of claim 1, wherein one of the instructions to inspect using the first technique and instructions to inspect using the second technique are instructions to inspect symbol tables in the protectable content.

26. The article of manufacture of claim 1 further comprising instructions to generate the protectable content by decompiling object code.

27. The article of manufacture of claim 1 further comprising instructions to generate the protectable content by compiling source code.

28. The article of manufacture of claim 1 further comprising instructions to generate the protectable content by decompressing compressed content.

29. The article of manufacture of claim 1, wherein the protectable content comprises one or more of a multimedia presentation, a video segment, an audio segment, a textual representation, a work of art, a visual representation, a technological know-how, a business know-how, and a contract right.

30. The article of manufacture of claim 1 further comprising instructions to inspect the protectable content using a third technique different than the first technique and the second technique, and wherein instructions to identify the content identified as a partial copy of a second source of content are further based on the inspection using the third technique.

31. The article of manufacture of claim 30 further comprising instructions to inspect the protectable content using a fourth technique different than the first technique, the second technique, and the third technique, and wherein instructions to identify the content identified as a partial copy of a second source of content are further based on the inspection using the fourth technique.

* * * * *